(12) United States Patent
Sasaki (10) Patent No.: US 8,527,188 B2
(45) Date of Patent: Sep. 3, 2013

(54) IGNITION TIMING CONTROLLER FOR INTERNAL COMBUSTION ENGINE

(75) Inventor: Yuji Sasaki, Ebina (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 280 days.

(21) Appl. No.: 13/153,737

(22) Filed: Jun. 6, 2011

(65) Prior Publication Data

US 2011/0303187 A1 Dec. 15, 2011

(30) Foreign Application Priority Data

Jun. 9, 2010 (JP) ................................. 2010-132289

(51) Int. Cl.
*F02P 5/152* (2006.01)
(52) U.S. Cl.
USPC .................. 701/111; 123/406.3; 123/406.33; 123/406.49
(58) Field of Classification Search
USPC ............ 701/111; 123/406.3, 406.31, 406.32, 123/406.33, 406.49
See application file for complete search history.

(56) References Cited

U.S. PATENT DOCUMENTS

| | | | |
|---|---|---|---|
| 4,805,574 A | 2/1989 | Sakamoto et al. | |
| 5,233,962 A * | 8/1993 | Fodale et al. | 123/406.3 |
| 6,240,900 B1 * | 6/2001 | Thomas et al. | 123/406.21 |
| 7,748,354 B2 * | 7/2010 | Petridis | 123/90.15 |
| 2006/0196472 A1 * | 9/2006 | Niimi | 123/406.45 |
| 2007/0095328 A1 * | 5/2007 | Brehob | 123/406.47 |
| 2008/0017167 A1 * | 1/2008 | Bhattarai | 123/406.3 |
| 2008/0060615 A1 * | 3/2008 | Christman et al. | 123/406.16 |
| 2009/0308367 A1 * | 12/2009 | Glugla | 123/575 |

FOREIGN PATENT DOCUMENTS

| | | |
|---|---|---|
| CN | 1550653 A | 12/2004 |
| CN | 101122275 A | 2/2008 |
| CN | 101265843 A | 9/2008 |
| JP | 3-279651 A | 12/1991 |
| JP | 7-208310 A | 8/1995 |
| JP | 2000-73925 A | 3/2000 |
| JP | 2004-116420 A | 4/2004 |
| JP | 2007-239481 | 9/2007 |

* cited by examiner

*Primary Examiner* — Erick Solis
(74) *Attorney, Agent, or Firm* — Drinker Biddle & Reath LLP (57) ABSTRACT

An ignition timing controller for an engine includes basic knock-limit ignition timing calculation means that calculates a basic knock-limit ignition timing on the basis of an operating state of the engine; learning-region variation calculation means that learns the knock-limit ignition timing of the engine in two operating regions and thereby calculates a learning-region variation due to octane number and a learning-region variation due to humidity in one of the operating regions; estimated variation calculation means that estimates a variation due to octane number and a variation due to humidity in a present operating state on the basis of the learning-region variation due to octane number and the learning-region variation due to humidity; and knock-limit ignition timing calculation means that calculates the knock-limit ignition timing in the present operating state on the basis of the basic knock-limit ignition timing, the variation due to octane number, and the variation due to humidity.

13 Claims, 8 Drawing Sheets

IGNITION TIMING CONTROLLER FOR INTERNAL COMBUSTION ENGINE

CROSS-REFERENCE TO RELATED APPLICATIONS

This application claims priority under 35 U.S.C. §119 from Japanese Patent Application No. 2010-132289, filed on Jun. 9, 2010, which is incorporated by reference herein in its entirety.

BACKGROUND OF THE INVENTION

1. Field of Invention

The present invention relates to an ignition timing controller for an internal combustion engine.

2. Description of Related Art

An existing ignition timing controller for an internal combustion engine advances the ignition timing to a level at which knock does not occur, calculates an indicator that shows the knock resistance of a fuel, and interpolates a knock-limit ignition timing when regular gasoline is used and a knock-limit ignition timing when high octane gasoline is used, which have been stored beforehand, by using the indicator of the knock resistance.

However, with the existing ignition timing controller for an internal combustion engine, it is impossible to distinguish, from data of the knock-limit ignition timing alone, whether the knock resistance has increased and the ignition timing has been advanced due to the difference in the octane number of a fuel or due to a high ambient humidity. Therefore, there is a problem in that, in the case where the ignition timing has been advanced because the ambient humidity is high, the interpolated knock-limit ignition timing may be deviated from the actual knock-limit ignition timing.

An object of the present invention, which has been achieved in view of such a problem, is to calculate the knock-limit ignition timing accurately.

SUMMARY OF THE INVENTION

According to the present invention, a basic knock-limit ignition timing is calculated on the basis of an operating state of the internal combustion engine. An operating state of the engine is determined based on a combination of an engine speed and an engine load (which may be determined by the amount of intake air to the engine), and can be represented as a point on a graph having engine speed and engine load as coordinate axes. The basic knock-limit ignition timing is a knock-limit ignition timing when a predetermined basic octane number fuel is used and an ambient humidity is at a predetermined basic ambient humidity. Then, the knock-limit ignition timing of the internal combustion engine in two predetermined operating regions are learned, and a learning-region variation due to octane number and a learning-region variation due to humidity are calculated on the basis of learning values of the knock-limit ignition timing in the two operating regions. An operating region is determined based on a combination of a range of engine speeds and a range of engine loads, and can be represented by a region on a graph having engine speed and engine load as coordinate axes. The learning-region variation due to octane number is an amount of change in the knock-limit ignition timing from the basic knock-limit ignition timing due to an influence of an octane number of a fuel used in one of the two operating regions, and the learning-region variation due to humidity is an amount of change in the knock-limit ignition timing from the basic knock-limit ignition timing due to an influence of the ambient humidity in the one of the two operating regions. Next, a variation due to octane number and a variation due to humidity are estimated on the basis of the learning-region variation due to octane number and the learning-region variation due to humidity. The variation due to octane number is the amount of change in the knock-limit ignition timing from the basic knock-limit ignition timing due to an influence of the octane number of the fuel used in a present operating state, and the variation due to humidity is the amount of change in the knock-limit ignition timing from the basic knock-limit ignition timing due to an influence of the ambient humidity in the present operating state. Lastly, the knock-limit ignition timing in the present operating state is calculated on the basis of the basic knock-limit ignition timing, the variation due to octane number, and the variation due to humidity.

The amount of change in the knock-limit ignition timing from the basic knock-limit ignition timing due to the influence of the octane number of fuel and the amount of change in the knock-limit ignition timing due to the influence of the ambient humidity are independently calculated, and are used to calculate a knock-limit ignition timing that accurately reflects the influences of the octane number of fuel and the ambient humidity. Therefore, the knock-limit ignition timing can be accurately calculated.

In one embodiment, an ignition timing controller is disclosed for an internal combustion engine. The controller includes a basic knock-limit ignition calculator, a learning-region variation calculator, an estimated variation calculator, and a knock-limit ignition timing calculator. The basic knock-limit ignition timing calculator calculates a basic knock-limit ignition timing on the basis of an operating state of the internal combustion engine, the basic knock-limit ignition timing being a knock-limit ignition timing when a predetermined basic octane number fuel is used and an ambient humidity is at a predetermined basic ambient humidity. The learning-region variation calculator learns the knock-limit ignition timing of the internal combustion engine in two predetermined operating regions and calculates a learning-region variation due to octane number and a learning-region variation due to humidity on the basis of learning values of the knock-limit ignition timing in the two operating regions, the learning-region variation due to octane number being an amount of change in the knock-limit ignition timing from the basic knock-limit ignition timing due to an influence of an octane number of a fuel used in one of the two operating regions, the learning-region variation due to humidity being an amount of change in the knock-limit ignition timing from the basic knock-limit ignition timing due to an influence of the ambient humidity in the one of the two operating regions. The estimated variation calculator estimates a variation due to octane number and a variation due to humidity on the basis of the learning-region variation due to octane number and the learning-region variation due to humidity, the variation due to octane number being the amount of change in the knock-limit ignition timing from the basic knock-limit ignition timing due to an influence of the octane number of the fuel used in a present operating state, the variation due to humidity being the amount of change in the knock-limit ignition timing from the basic knock-limit ignition timing due to an influence of the ambient humidity in the present operating state. The knock-limit ignition timing calculator calculates the knock-limit ignition timing in the present operating state on the basis of the basic knock-limit ignition timing, the variation due to octane number, and the variation due to humidity.

In another embodiment, an ignition timing controller for an internal combustion engine is disclosed. The controller includes a basic knock-limit ignition means, a learning-region variation calculation means, an estimated variation calculation means, and a knock-limit ignition timing calculation means. The basic knock-limit ignition timing calculation means calculates a basic knock-limit ignition timing on the basis of an operating state of the internal combustion engine, the basic knock-limit ignition timing being a knock-limit ignition timing when a predetermined basic octane number fuel is used and an ambient humidity is at a predetermined basic ambient humidity. The learning-region variation calculation means learns the knock-limit ignition timing of the internal combustion engine in two predetermined operating regions and calculates a learning-region variation due to octane number and a learning-region variation due to humidity on the basis of learning values of the knock-limit ignition timing in the two operating regions, the learning-region variation due to octane number being an amount of change in the knock-limit ignition timing from the basic knock-limit ignition timing due to an influence of an octane number of a fuel used in one of the two operating regions, the learning-region variation due to humidity being an amount of change in the knock-limit ignition timing from the basic knock-limit ignition timing due to an influence of the ambient humidity in the one of the two operating regions. The estimated variation calculation means estimates a variation due to octane number and a variation due to humidity on the basis of the learning-region variation due to octane number and the learning-region variation due to humidity, the variation due to octane number being the amount of change in the knock-limit ignition timing from the basic knock-limit ignition timing due to an influence of the octane number of the fuel used in a present operating state, the variation due to humidity being the amount of change in the knock-limit ignition timing from the basic knock-limit ignition timing due to an influence of the ambient humidity in the present operating state. The knock-limit ignition timing calculation means calculates the knock-limit ignition timing in the present operating state on the basis of the basic knock-limit ignition timing, the variation due to octane number, and the variation due to humidity.

In yet another embodiment, an ignition timing control method is provided for an internal combustion engine. The method includes calculating a basic knock-limit ignition timing on the basis of an operating state of the internal combustion engine, the basic knock-limit ignition timing being a knock-limit ignition timing when a predetermined basic octane number fuel is used and an ambient humidity is at a predetermined basic ambient humidity. The method further includes learning the knock-limit ignition timing of the internal combustion engine in two predetermined operating regions and calculating a learning-region variation due to octane number and a learning-region variation due to humidity on the basis of learning values of the knock-limit ignition timing in the two operating regions, the learning-region variation due to octane number being an amount of change in the knock-limit ignition timing from the basic knock-limit ignition timing due to an influence of an octane number of a fuel used in one of the two operating regions, the learning-region variation due to humidity being an amount of change in the knock-limit ignition timing from the basic knock-limit ignition timing due to an influence of the ambient humidity in the one of the two operating regions. The method additionally includes estimating a variation due to octane number and a variation due to humidity on the basis of the learning-region variation due to octane number and the learning-region variation due to humidity, the variation due to octane number being the amount of change in the knock-limit ignition timing from the basic knock-limit ignition timing due to an influence of the octane number of the fuel used in a present operating state, the variation due to humidity being the amount of change in the knock-limit ignition timing from the basic knock-limit ignition timing due to an influence of the ambient humidity in the present operating state. The method further includes calculating the knock-limit ignition timing in the present operating state on the basis of the basic knock-limit ignition timing, the variation due to octane number, and the variation due to humidity.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

An embodiment of the present invention will be described with reference to the drawings. In the following description, the term "low octane fuel" refers to a fuel having an octane number of about 92, such as regular gasoline. The term "high octane fuel" refers to a fuel having an octane number of about 102, such as high octane gasoline. The term "low humidity" refers to a condition in which the pressure of water vapor in the air ("water vapor partial pressure") is about 1 kPa. The term "high humidity" refers to a condition in which the water vapor partial pressure is about 7 kPa. The term "operating state" is a combination of an engine speed and an engine load (amount of intake air), and may be called "operating point" because an operating state is represented by a point in a plane having the engine speed and the engine load as the coordinate axes. The term "operating region" is a combination of a range of engine speed and a range of engine load (amount of intake air), and is represented by a region having a certain area in a plane having the engine speed and the engine load as the coordinate axes.

Figure 1:
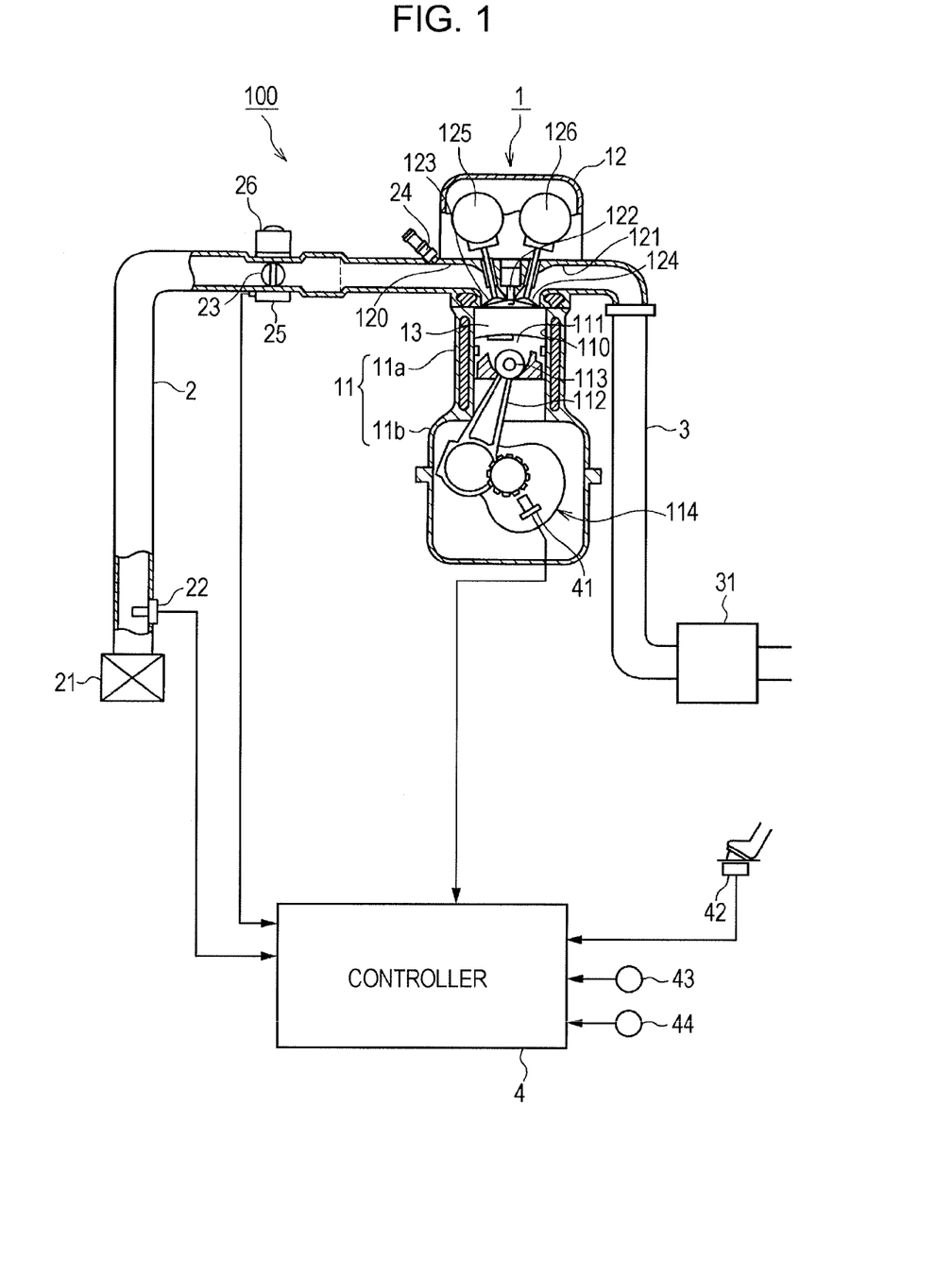
FIG. 1 is a schematic view of an ignition timing controller for a spark-ignition internal combustion engine according to an embodiment of the present invention.

FIG. 1 is a schematic view of an ignition timing controller 100 for a spark-ignition internal combustion engine 1 according to an embodiment of the present invention. The ignition timing controller 100 for the engine 1 includes an intake pipe 2, an exhaust pipe 3, and a controller 4. Intake air flows into the engine 1 through the intake pipe 2. Combustion exhaust gas is discharged from and the engine 1 through the exhaust pipe 3.

The engine 1 includes a cylinder block 11 and a cylinder head 12. The cylinder block 11 includes a cylinder portion 11a and a crankcase 11b. The cylinder portion 11a has a plurality of cylinders 110. A piston 111, which reciprocates in the cylinder 110 due to a combustion pressure, is disposed in each of the cylinders 110. A piston pin 113 is inserted through the piston 111, and one end of a connecting rod 112 is attached to the piston pin 113. The crankcase 11b is disposed below the cylinder portion 11a. The crankcase 11b rotatably supports a crankshaft 114. The crankshaft 114 converts reciprocation of the piston 111 into rotation through the connecting rod 112. The cylinder head 12 is attached to the upper surface of the cylinder block 11. The cylinder head 12, the cylinder 110, and the piston 111 form a part of a combustion chamber 13.

An intake port 120 and an exhaust port 121 are formed in the cylinder head 12. The intake port 120 connects the intake pipe 2 to an opening formed in the top wall of the combustion chamber 13. The exhaust port 121 connects the exhaust pipe 3 to an opening formed in the top wall of the combustion chamber 13. An ignition plug 122 is formed in the top wall of the combustion chamber 13 at the center of the top wall. An intake valve 123 and an exhaust valve 124 are disposed in the cylinder head 12. The intake valve 123 opens or closes the opening between the combustion chamber 13 and the intake port 120. The exhaust valve 124 opens and closes the opening between the combustion chamber 13 and the exhaust port 121. An intake cam shaft 125 and an exhaust cam shaft 126 are disposed in the cylinder head 12. The intake cam shaft 125 opens and closes the intake valve 123. The exhaust cam shaft 126 opens and closes the exhaust valve 124.

An air cleaner 21, an airflow meter 22, a throttle valve 23 that is electronically controlled, and a fuel injection valve 24 are disposed in the intake pipe 2 in this order from the upstream side. The air cleaner 21 removes foreign substances, such as sand, from the intake air. The airflow meter 22 detects the amount of intake air. The throttle valve 23 adjusts the amount of air taken into the cylinder 110 by changing the cross-sectional area of the intake pipe 2. A throttle actuator 26 opens and closes the throttle valve 23, and a throttle sensor 25 detects the degree of opening of the throttle valve 23. The fuel injection valve 24 injects fuel toward the intake port 120 in accordance with the operating state of the engine 1. A three-way catalyst 31, which removes harmful substances, such as hydrocarbons and nitrogen oxides, from the exhaust gas is disposed in the exhaust pipe 3.

The controller 4 is a microcomputer including a central processing unit (CPU), a read-only memory (ROM), a random access memory (RAM), and an input/output interface (I/O interface). Detection signals from the following sensors, for detecting the operating state of the engine 1, are input to the controller 4: the airflow meter 22; the throttle sensor 25; an engine speed sensor 41 for detecting the engine speed on the basis of the crank angle; an accelerator stroke sensor 42 for detecting the depressed amount of the accelerator pedal, which indicates the engine load; a fuel sensor 43 for detecting whether fuel is supplied; and an ignition sensor 44 for detecting an engine start signal.

In accordance with the detected operating state of the engine 1, the controller 4 controls the ignition timing of the ignition plug 122 so that the ignition timing becomes the optimal ignition timing (e.g., the MBT, the minimum advance for the best torque) or the knock-limit ignition timing. To be specific, if the optimal ignition timing is retarded from the knock-limit ignition timing, the ignition timing is controlled to become the optimal ignition timing. If the optimal ignition timing is advanced from the knock-limit ignition timing, the ignition timing is controlled to become the knock-limit ignition timing. This is because, if the ignition timing is advanced from the knock-limit ignition timing, knock exceeding an allowable limit occurs, and the power and the durability of the engine are reduced. Therefore, it is necessary to prevent the ignition timing from being advanced from the knock-limit ignition timing. To do so, it is necessary to accurately calculate the knock-limit ignition timing.

The optimal ignition timing does not depend on the octane number of fuel and the ambient humidity. The optimal ignition timing does not change when the octane number of fuel or the ambient humidity changes, as long as the engine speed and the engine load are the same. Therefore, the optimal ignition timing can be calculated on the basis of the operating state of the engine by using one map.

However, the knock-limit ignition timing depends on the octane number of fuel and the ambient humidity. Even if the engine speed and the engine load are the same, the knock-limit ignition timing changes in accordance with the octane number of fuel and the ambient humidity. To be specific, even if the engine speed and the engine load are the same, the higher the octane number of fuel, the more advanced the knock-limit ignition timing. The higher the ambient humidity, the more advanced the knock-limit ignition timing.

Under previously existing technology, in order to calculate the knock-limit ignition timing by using a map, it is necessary to prepare a map in which a basic knock-limit ignition timing is set on the basis of the engine speed and the engine load and a plurality of correction maps corresponding to the octane number of fuel and the ambient humidity, and to calculate the knock-limit ignition timing by referring to the maps. Consequently, a large number of grids of a map or the number of maps is required in order to accurately calculate the knock-limit ignition timing, and it is necessary to carry out a large preliminary experiment to make the maps, which raises a problem in that man-hours for development and the cost for development increase.

To solve this problem, a method is provided herein for calculating the knock-limit ignition timing by learning during operation. With this method, the basic knock-limit ignition timing BIT is calculated on the basis of the engine speed and the engine load, the ignition timing is gradually advanced from the basic knock-limit ignition timing, and an ignition timing at which weak knock occurs is learned as the knock-limit ignition timing in the operating state.

To accurately learn the knock-limit ignition timing by using such a method, it is necessary to perform learning in the entire operating region. However, because the engine speed and the engine load change momentarily, it is difficult to perform learning at the same engine speed and the same engine load for a long time. Moreover, in an operating region having comparatively low frequency of use, there is limited opportunity for performing learning.

Additionally, as described above, the knock-limit ignition timing changes in accordance with the octane number of fuel and the ambient humidity even if the engine speed and the engine load are the same. That is, the learning value of the knock-limit ignition timing can be considered to be the sum of the advance due to the influence of octane number ("advance due to octane number") and the advance due to the influence of the ambient humidity ("advance due to humidity"). However, by simply using the learning value, the proportion of the advance due to octane number in the learning value and the proportion of the advance due to humidity in the learning value cannot be obtained. Therefore, if, for example, when the ambient humidity is low, the ignition timing is set at the knock-limit ignition timing that was learned when the ambient humidity was high, knock may occur due to an excessive advance. On the contrary, if, when the ambient humidity is high, the ignition timing is set at the knock-limit ignition timing that was learned when the ambient humidity was low, fuel economy may decline due to an excessive retarding of the knock-limit ignition timing.

Therefore, without further analysis, the method of calculating the knock-limit ignition timing by learning described above results in a learning value of the knock-limit ignition timing that tends to deviate from the actual knock-limit ignition timing, which causes a problem in that the knock-limit ignition timing is not accurately calculated.

To prevent this, in the present embodiment, the knock-limit ignition timing is accurately calculated by independently calculating the advance due to octane number and the advance due to humidity. To be specific, a basic knock-limit ignition timing is first calculated that is a knock-limit ignition timing when the humidity is low and a low octane fuel is used in the present operating state (the engine speed and the engine load).

Next, learning of the knock-limit ignition timing is performed in two predetermined operating regions that are not directly related to the present operating state but having comparatively high frequency of use. On the basis of the learning values of the knock-limit ignition timing in the two operating regions, the advance due to octane number ("learning-region advance due to octane number") and the advance due to humidity ("learning-region advance due to humidity") in one of the operating regions are calculated. Then, on the basis of the learning-region advance due to octane number and the learning-region advance due to humidity, which have been thus learned, the advance due to octane number ("estimated advance due to octane number") and the advance due to humidity ("estimated advance due to humidity") in the present operating state are calculated.

Lastly, the estimated advance due to octane number and the estimated advance due to humidity are added to the basic knock-limit ignition timing, whereby the knock-limit ignition timing in the present operating state is calculated. Hereinafter, knock-limit ignition timing calculation control according to the present embodiment will be described.

Figure 2:
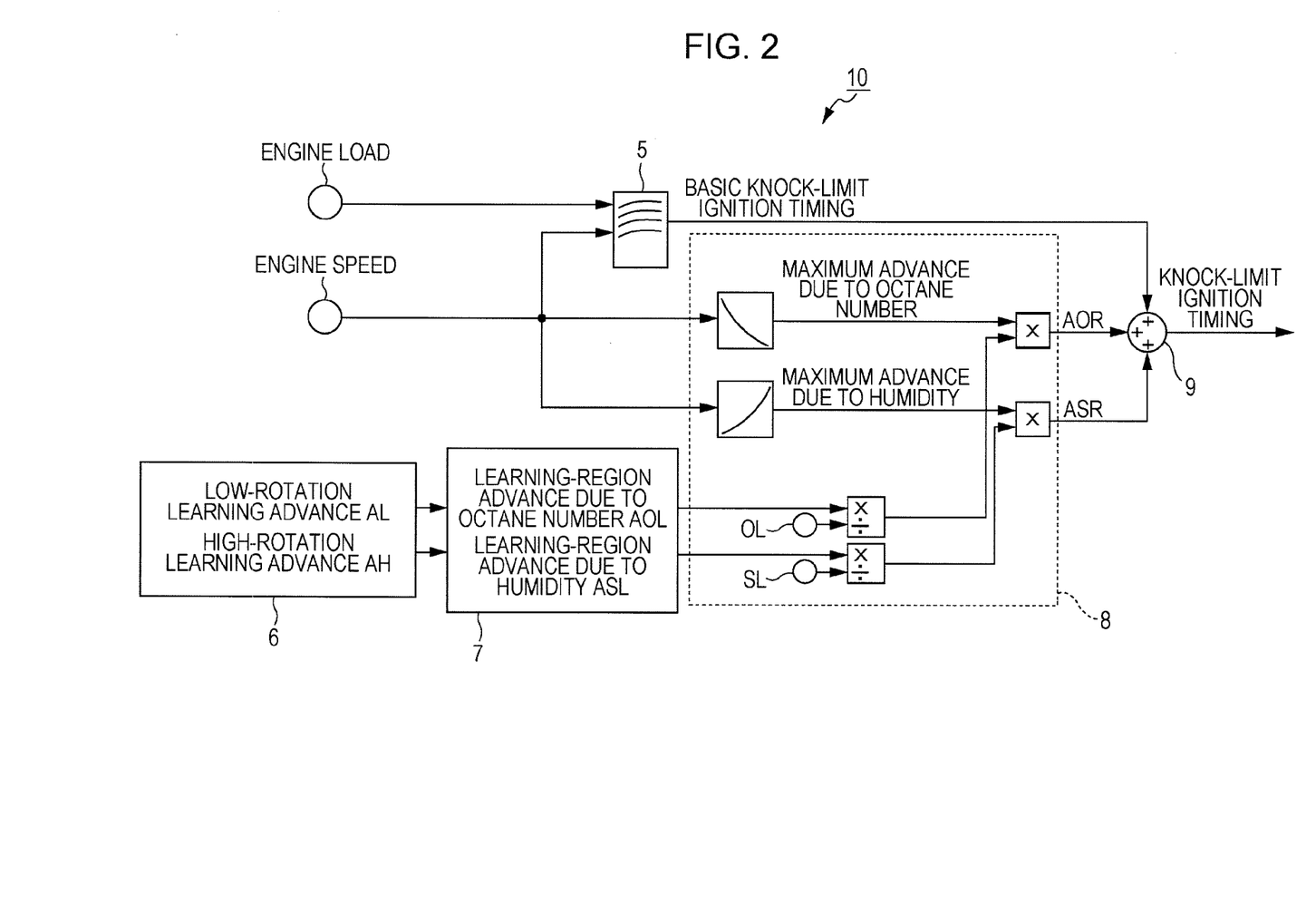
FIG. 2 is a block diagram of knock-limit ignition timing calculation control according to the embodiment of the present invention.

FIG. 2 is a block diagram of the knock-limit ignition timing calculation control according to the present embodiment. As illustrated in FIG. 2, a knock-limit ignition timing calculator 10 includes a basic knock-limit ignition timing calculator 5, a learning value calculator 6, a learning-region advance calculator 7, an estimated advance calculator 8, and an adder 9.

The basic knock-limit ignition timing calculator 5 calculates the basic knock-limit ignition timing on the basis of the engine speed and the engine load. The details will be described below with reference to FIG. 3. The learning value calculator 6 calculates the learning value of the knock-limit ignition timing in two predetermined operating regions having comparatively high frequency of use. To be specific, the learning value of the knock-limit ignition timing in a low rotation operating region ("low rotation region") having comparatively high frequency of use, that is, an advance ("low-rotation learning advance") AL from the basic knock-limit ignition timing in the low rotation region is calculated. Further, the learning value of the knock-limit ignition timing in a high rotation operating region ("high rotation region") having comparatively high frequency of use, that is, an advance ("high-rotation learning advance") AH from the basic knock-limit ignition timing in the high rotation region is calculated. The details will be described below with reference to FIG. 4.

In the present embodiment, the low rotation region corresponds to engine speed in the range of about 800 to 1200 rpm. The high rotation region corresponds to engine speed in the range of about 3000 to 3400 rpm. The low rotation region and the high rotation region are not limited to these regions and may be set as an operating region having comparatively high frequency of use in accordance with the characteristics of the engine 1.

The learning-region advance calculator 7 calculates the learning-region advance due to octane number and the learning-region advance due to humidity on the basis of the low-rotation learning advance AL and the high-rotation learning advance AH. In the present embodiment, an advance due to octane number AOL and an advance due to humidity ASL in the low rotation region are respectively the learning-region advance due to octane number and the learning-region advance due to humidity. The details will be described below with reference to FIGS. 5A to 7.

The estimated advance calculator 8 calculates the estimated advance due to octane number AOR and the estimated advance due to humidity ASR on the basis of the learning-region advance due to octane number and the learning-region advance due to humidity. The details will be described below with reference to FIGS. 5A to 7. The adder 9 calculates the knock-limit ignition timing by adding the estimated advance due to octane number AOR and the estimated advance due to humidity ASR to the basic knock-limit ignition timing.

Figure 3:
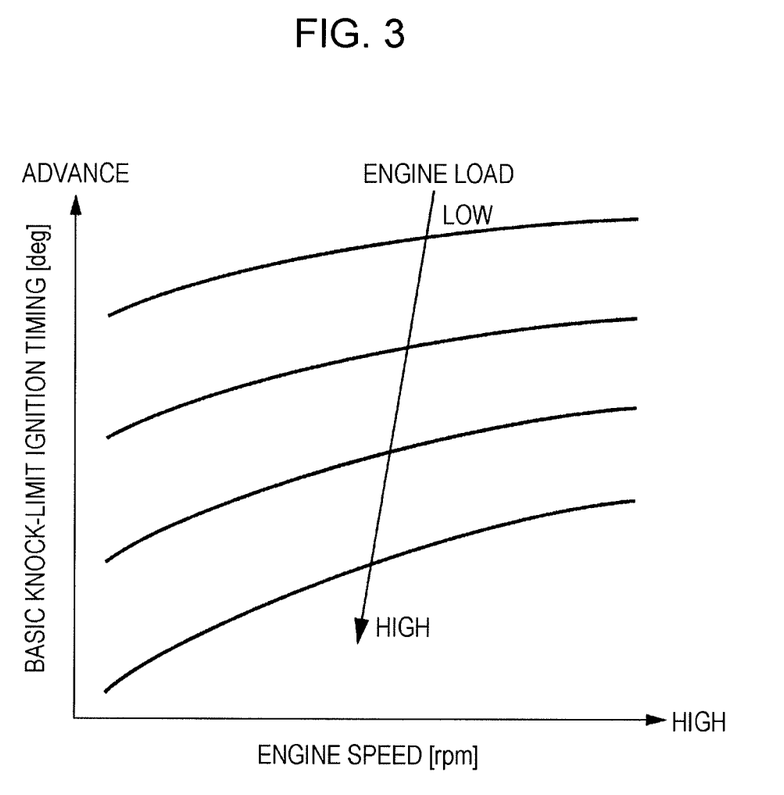
FIG. 3 is a map used for calculating a basic knock-limit ignition timing according to the embodiment of the present invention.

FIG. 3 is a map used for calculating the basic knock-limit ignition timing on the basis of the engine speed and the engine load. The map is prepared beforehand by performing a preliminary experiments and the like, and is stored in the controller 4. As described above, in the present embodiment, the basic knock-limit ignition timing is the knock-limit ignition timing when the humidity is low and a low octane fuel is used. This is because knock most often occurs when the humidity is low and a low octane fuel is used, and therefore the knock-limit ignition timing is the most retarded. As illustrated in FIG. 3, the basic knock-limit ignition timing is calculated on the basis of the engine speed and the engine load. The higher the engine speed and the lower the engine load, the more advanced the basic knock-limit ignition timing is set.

Figure 4:
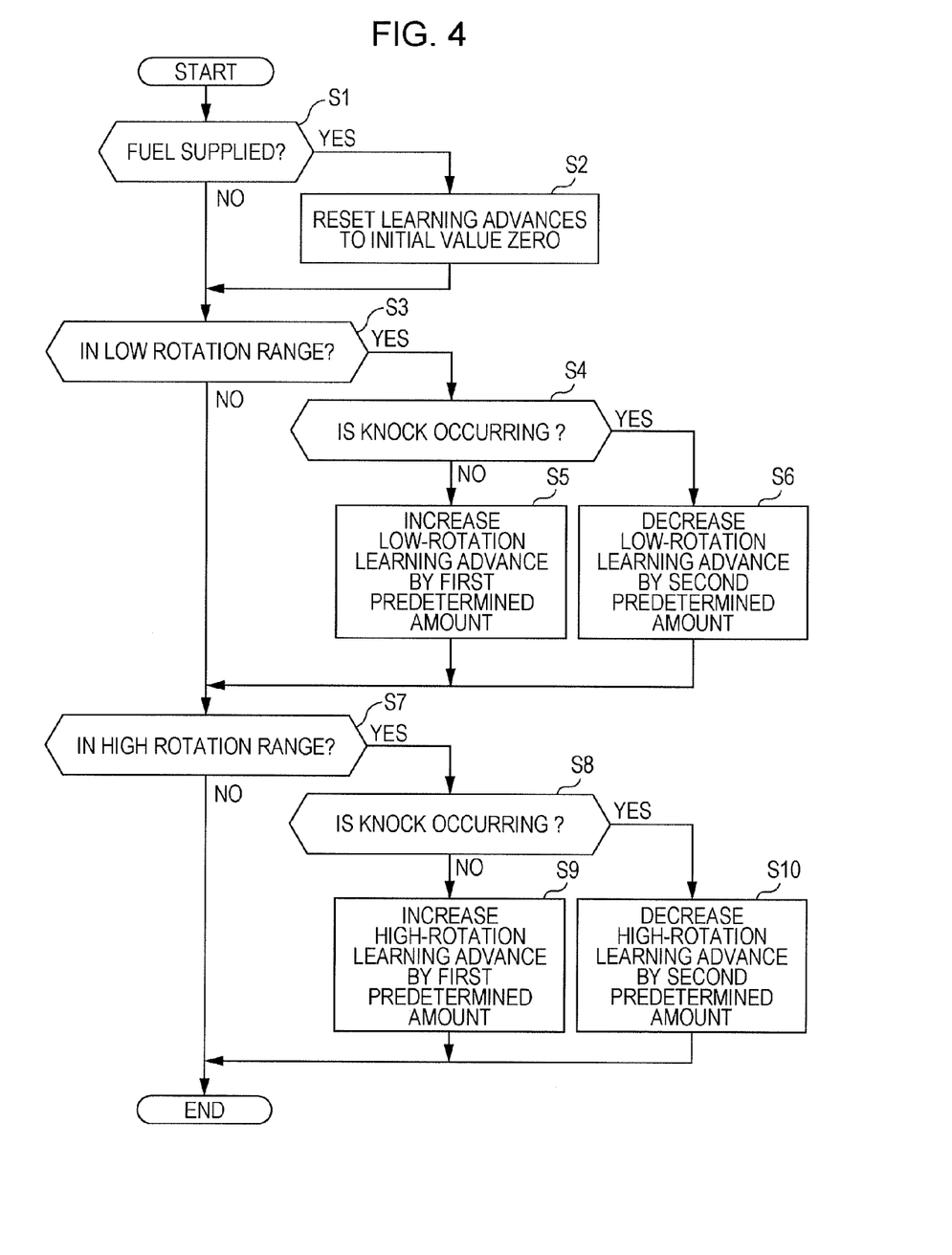
FIG. 4 is a flowchart of a learning value calculation routine according to the embodiment of the present invention.

FIG. 4 is a flowchart of a learning value calculation routine for calculating the low-rotation learning advance AL and the high-rotation learning advance AH. The controller 4 repeatedly performs the routine at each predetermined calculation period (for example, 10 ms).

In step S1, the controller 4 determines whether the octane number of fuel has changed. To be specific, the controller detects whether new fuel has been supplied to the engine 1. If new fuel has been supplied, by refueling the vehicle for example, the controller 4 performs step S2. If new fuel has not been supplied, the controller 4 performs step S3.

In step S2, the controller 4 resets the low-rotation learning advance AL and the high-rotation learning advance AH to the initial value of zero. In step S3, the controller 4 determines whether the engine speed is in the low rotation region. If the engine speed is in the low rotation region, the controller 4 performs step S4. If not, the controller performs step S7. In step S4, the controller 4 determines whether knock is occurring. If knock is not occurring, the controller 4 performs step S5. If knock is occurring, the controller 4 performs step S6. In step S5, the controller 4 increases the low-rotation learning advance AL by a first predetermined amount.

In step S6, the controller 4 decreases the low-rotation learning advance AL by a second predetermined amount. The second predetermined amount is larger than the first predetermined amount. In step S7, the controller 4 determines whether the engine speed is in the high rotation region. If the engine speed is in the high rotation region, the controller 4 performs step S8. If not, the controller 4 finishes the present process. In step S8, the controller 4 determines whether knock is occurring. If knock is not occurring, the controller 4 performs step S9. If knock is occurring, the controller 4 performs step S10. In step S9, the controller 4 increases the high-rotation learning advance AH by the first predetermined amount. In step S10, the controller 4 decreases the high-rotation learning advance AH by the second predetermined amount.

Figure 5A:
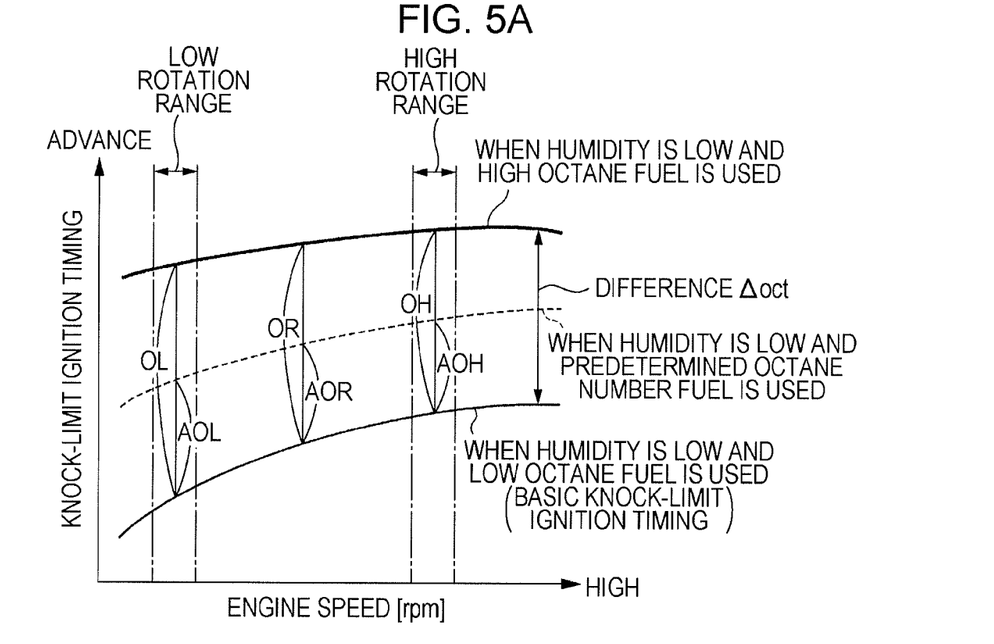
FIGS. 5A and 5B are graphs illustrating a method of calculating an learning-region advance due to octane number and an learning-region advance due to humidity according to the embodiment of the present invention.

Referring to FIGS. 5A to 7, a method of calculating the learning-region advance due to octane number and the learning-region advance due to humidity will be described. FIG. 5A illustrates the relationship between the engine speed and the knock-limit ignition timing when the humidity is low (at the basic ambient humidity) and the engine load is at a predetermined level, which is illustrated in accordance with the octane number of fuel. In FIG. 5A, a thin solid line shows the knock-limit ignition timing when a low octane fuel is used (when the basic octane number fuel is used), and a thick solid line shows the knock-limit ignition timing when a high octane fuel is used (when the reference octane number fuel is used). Therefore, the thin solid line shows the basic knock-limit ignition timing at the predetermined engine load.

As illustrated in FIG. 5A, when the engine load and the ambient humidity are the same, the knock-limit ignition timing when a high octane fuel is used is more advanced than the knock-limit ignition timing when a low octane fuel is used. This is because the higher the octane number, the higher the knock resistance. The knock-limit ignition timing gradually moves toward the advanced side along a slightly upward-convex curve as the engine speed increases. However, the amount of movement differs depending on the octane number of fuel. The amount of movement is smaller when a high octane fuel is used than when a low octane fuel is used. That is, as illustrated in FIG. 6, the difference $\Delta$oct between the knock-limit ignition timing when a high octane fuel is used and the knock-limit ignition timing when a low octane fuel is used decreases as the engine speed increases.

Figure 6:
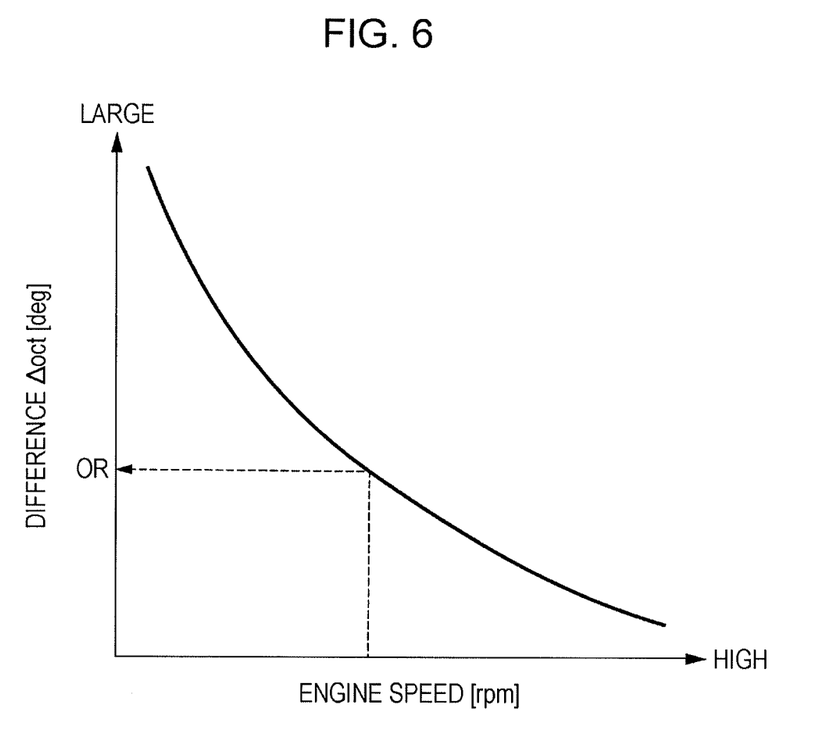
FIG. 6 is a graph representing the relationship between the engine speed and the difference Δoct between the knock-limit ignition timing when high octane fuel is used and the knock-limit ignition timing when low octane fuel is used.

FIG. 6 is a graph representing the relationship between the engine speed and the difference $\Delta$oct between the knock-limit ignition timing when a high octane fuel is used and the knock-limit ignition timing when a low octane fuel is used. In the present embodiment, this graph is prepared beforehand by performing a preliminary experiment and the like, and is stored in the controller 4. By referring to this graph, the difference $\Delta$oct between the knock-limit ignition timing when a high octane fuel is used and the knock-limit ignition timing when a low octane fuel is used at the present engine speed, that is, the advance ("maximum advance due to octane number") OR from the knock-limit ignition timing when a low octane fuel is used to the knock-limit ignition timing when a high octane fuel is used at the present engine speed is calculated.

Referring back to FIG. 5A, the difference $\Delta$oct does not change when the engine load changes, and depends only on the engine speed. That is, when the engine load changes, a curve representing the knock-limit ignition timing moves up and down in accordance with the engine load while maintaining the shape illustrated with a solid line in FIG. 5A. Therefore, the difference $\Delta$oct is, in other words, the maximum advance due to octane number when the humidity is low.

The knock-limit ignition timing has a characteristic such that the higher the octane number of fuel, the smaller the amount of movement toward the advanced side. Therefore, the knock-limit ignition timing when a fuel having an octane number between the low octane number and the high octane number ("predetermined octane number fuel") is used is as illustrated by a broken line in FIG. 5A, and the amount of movement thereof is smaller than when a low octane fuel is used and larger than when a high octane fuel is used.

If the present fuel is the predetermined octane number fuel, as illustrated in FIG. 5A, the advance from the knock-limit ignition timing of a low octane fuel to the knock-limit ignition timing of the predetermined octane number fuel in the low rotation region is the advance due to octane number AOL in the low rotation region. In the present embodiment, the advance due to octane number AOL in the low rotation region is the learning-region advance due to octane number. The advance from the knock-limit ignition timing of a low octane fuel to the knock-limit ignition timing of the predetermined octane number fuel in the high rotation region is the advance due to octane number AOH in the high rotation region.

Figure 5B:
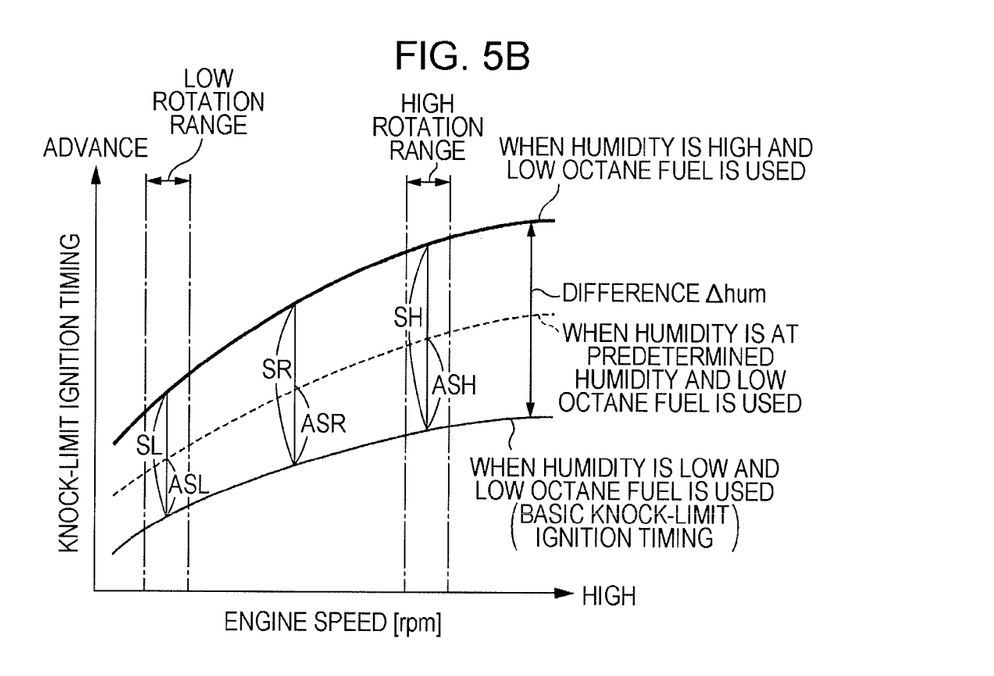

FIG. 5B illustrates the relationship between the engine speed and the knock-limit ignition timing when a low octane fuel is used (when the basic octane number fuel is used) and the engine load is at a predetermined level, which is illustrated in accordance with the ambient humidity. In FIG. 5B, a thin solid line shows the knock-limit ignition timing when the humidity is low (at the basic ambient humidity), and a thick solid line shows the knock-limit ignition timing when the humidity is high (at the reference ambient humidity). Therefore, the thin solid line is the basic knock-limit ignition timing at the predetermined engine load.

Figure 7:
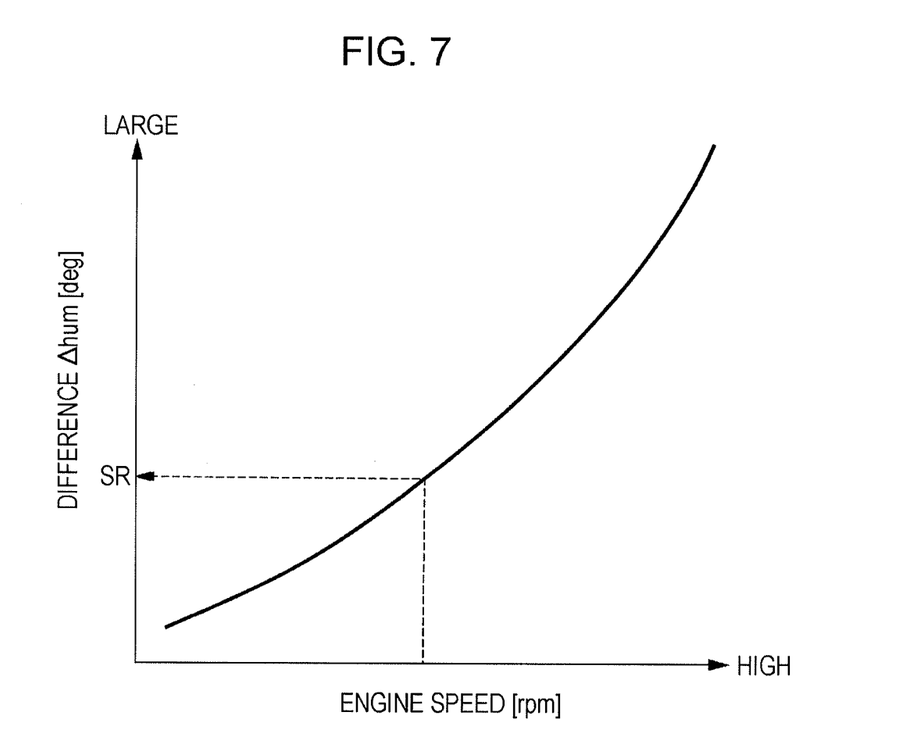
FIG. 7 is a graph representing the relationship between the engine speed and the difference Δhum between the knock-limit ignition timing when the humidity is high and the knock-limit ignition timing when the humidity is low.

As illustrated in FIG. 5B, when the engine load and the octane number of fuel are the same, the knock-limit ignition timing when the humidity is high is more advanced than the knock-limit ignition timing when the humidity is low. This is because the higher the humidity, the higher the knock resistance. The knock-limit ignition timing gradually moves toward the advanced side along a slightly upward-convex curve as the engine speed increases. However, the amount of movement differs depending on the ambient humidity. The amount of movement is smaller when the humidity is low than when the humidity is high. That is, as illustrated in FIG. 7, the difference $\Delta$hum between the knock-limit ignition timing when the humidity is high and the knock-limit ignition timing when the humidity is low increases as the engine speed increases. This relationship is opposite to that of FIG. 5A.

FIG. 7 is a graph representing the relationship between the engine speed and the difference $\Delta$hum between the knock-limit ignition timing when the humidity is high and the knock-limit ignition timing when the humidity is low. In the present embodiment, this graph is prepared beforehand by performing a preliminary experiment and the like, and is stored in the controller 4. By referring to this graph, the difference $\Delta$hum between the knock-limit ignition timing when the humidity is high and the knock-limit ignition timing when the humidity is low at the present engine speed, that is, the advance ("maximum advance due to humidity") SR from the knock-limit ignition timing when the humidity is low to the knock-limit ignition timing when the humidity is high at the present engine speed is calculated.

Referring back to FIG. 5B, the difference $\Delta$hum does not change when the engine load changes, and depends only on the engine speed. That is, when the engine load changes, a curve representing the knock-limit ignition timing moves in accordance with the engine load while maintaining the shape illustrated with a solid line in FIG. 5B. Therefore, the difference Δhum is, in other words, the maximum advance due to humidity when a low octane fuel is used.

The knock-limit ignition timing has a characteristic such that the higher the ambient humidity, the larger the amount of movement toward the advanced side. Therefore, the knock-limit ignition timing at a humidity between the high humidity and the low humidity ("predetermined humidity") is as illustrated by a broken line in FIG. 5B, and the amount of movement thereof is larger than when the humidity is low and smaller than when the humidity is high.

If the present ambient humidity is at the predetermined humidity, as illustrated in FIG. 5B, the advance from the knock-limit ignition timing when the humidity is low to the knock-limit ignition timing when the humidity is at the predetermined humidity in the low rotation region is the advance due to humidity ASL in the low rotation region. In the present embodiment, the advance due to humidity ASL in the low rotation region is the learning-region advance due to humidity. The advance from the knock-limit ignition timing when the humidity is low to the knock-limit ignition timing when the humidity is at the predetermined humidity in the high rotation region is the advance due to humidity ASH in the high rotation region.

As described above, the learning value of the knock-limit ignition timing can be considered to be the sum of the advance due to octane number and the advance due to humidity. Therefore, as shown in the following equation (1), the low-rotation learning advance AL can be considered to be the sum of the advance due to octane number AOL in the low rotation region and the advance due to humidity ASL in the low rotation region.

$$AL = AOL + ASL \quad (1)$$

where AL is the low-rotation learning advance, AOL is the advance due to octane number in low rotation region, and ASL is the: advance due to humidity in low rotation region.

As shown in the following equation (2), the high-rotation learning advance AH can be considered to be the sum of the advance due to octane number AOH in the high rotation region and the advance due to humidity ASH in the high rotation region.

$$AH = AOH + ASH \quad (2)$$

where AH is the high-rotation learning advance, AOH is the advance due to octane number in high rotation region, and ASH is the advance due to humidity in high rotation region.

As illustrated in FIG. 5A, the difference Δoct between the knock-limit ignition timing when a high octane fuel is used and the knock-limit ignition timing when a low octane fuel is used in the low rotation region is defined as the maximum advance due to octane number OL in the low rotation region. Likewise, the difference Δoct between the knock-limit ignition timing when a high octane fuel is used and the knock-limit ignition timing when a low octane fuel is used in the high rotation region is defined as the maximum advance due to octane number OH in the high rotation region.

It is assumed that the ratio of the advance from the knock-limit ignition timing of a low octane fuel to the knock-limit ignition timing of a high octane fuel (i.e., the maximum advance due to octane number) to the advance from the knock-limit ignition timing of the low octane fuel to the knock-limit ignition timing of the predetermined octane number fuel is the same for all engine speeds. That is, it is assumed that the following equation (3) holds.

$$\frac{AOR}{OR} = \frac{AOL}{OL} = \frac{AOH}{OH} \quad (3)$$

wherein OR is the maximum advance due to octane number at present engine speed, AOR is the advance due to octane number at present engine speed, OL is the maximum advance due to octane number in low rotation region, OH is the maximum advance due to octane number in high rotation region Then, the advance due to octane number AOH in the high rotation region is represented by equation (4), which is obtained by transforming equation (3).

$$AOH = OH \times \frac{AOL}{OL} \quad (4)$$

As illustrated in FIG. 5B, the difference Δhum between the knock-limit ignition timing when the humidity is high and the knock-limit ignition timing when the humidity is low in the low rotation region is defined as the maximum advance due to humidity SL in the low rotation region. Likewise, the difference Δhum between the knock-limit ignition timing when the humidity is high and the knock-limit ignition timing when the humidity is low in the high rotation region is defined as the maximum advance due to humidity SH in the high rotation region.

It is assumed that the ratio of the advance from the knock-limit ignition timing when the humidity is low to the knock-limit ignition timing when the humidity is high (i.e., the maximum advance due to humidity) to the advance from the knock-limit ignition timing when the humidity is low to the knock-limit ignition timing when the humidity is at the predetermined humidity is the same for all engine speed. That is, it is assumed that the following equation (5) holds.

$$\frac{ASR}{SR} = \frac{ASL}{SL} = \frac{ASH}{SH} \quad (5)$$

where SR is the maximum advance due to humidity at present engine speed, ASR si the advance due to humidity at present engine speed, SL is the maximum advance due to humidity in low rotation region, and SH is the maximum advance due to humidity in high rotation region.

Then, the advance due to humidity ASH in the high rotation region is represented by the following equation (6), which is obtained by transforming equation (5).

$$ASH = SH \times \frac{ASL}{SL} \quad (6)$$

By substituting equations (4) and (6) to equation (2), the following equation (7) is obtained.

$$AH = OH \times \frac{AOL}{OL} + SH \times \frac{ASL}{SL} \quad (7)$$

By subtracting equation (7) multiplied by SL/SH from equation (1), the following equation (8) is obtained.

$$AL - AH \times \frac{SL}{SH} = AOL + ASL - AOL \times \frac{OH}{OL} \times \frac{SL}{SH} - ASL \quad (8)$$

$$= AOL \times \left(1 - \frac{OH}{OL} \times \frac{SL}{SH}\right)$$

Using equation (8), the advance due to octane number AOL in the low rotation region can be represented by the following equation (9).

$$AOL = \frac{AL - AH \times \frac{SL}{SH}}{1 - \frac{OH}{OL} \times \frac{SL}{SH}} \quad (9)$$

In equation (9), the low-rotation learning advance AL and the high-rotation learning advance AH are learning values that are detected when the engine is operating. Therefore, the advance due to octane number AOL in the low rotation region can be calculated by calculating beforehand the maximum advance due to octane number OL in the low rotation region, the maximum advance due to octane number OH in the high rotation region, the maximum advance due to humidity SL in the low rotation region, and the maximum advance due to humidity SH in the high rotation region by performing a preliminary experiment and by storing these values in the controller 4.

When the advance due to octane number AOL in the low rotation region is known, the advance due to humidity ASL in the low rotation region can be calculated from equation (1) and equation (9) as shown in the following equation (10).

$$ASL = AL - AOL \quad (10)$$

$$= AL - \frac{AL - AH \times \frac{SL}{SH}}{1 - \frac{OH}{OL} \times \frac{SL}{SH}}$$

Likewise, the advance due to octane number AOH in the high rotation region and the advance due to humidity ASH in the high rotation region can be calculated.

Next, a method of calculating the estimated advance due to octane number AOR and the estimated advance due to humidity ASR will be described.

When the advance due to octane number AOL in the low rotation region is known, the advance due to octane number at the present engine speed, i.e., the estimated advance due to octane number AOR, is represented by the following equation (11), which is obtained by transforming equation (3).

$$AOR = OR \times \frac{AOL}{OL} \quad (11)$$

When the advance due to humidity ASL in the low rotation region is known, the advance due to humidity at the present engine speed, i.e., the estimated advance due to humidity ASR, is represented by the following equation (12), which is obtained by transforming equation (5).

$$ASR = SR \times \frac{ASL}{SL} \quad (12)$$

The maximum advance due to octane number OR at the present engine speed can be calculated by referring to the graph of FIG. 6. The maximum advance due to humidity SR at the present engine speed can be calculated by referring to the graph of FIG. 7.

Accordingly, the knock-limit ignition timing with consideration of the octane number of fuel and the ambient humidity in the present operating state can be calculated as represented by the following equation (13).

knock-limit ignition timing=*BIT+AOR+ASR* (13)

where BIT is the basic knock-limit ignition timing.

Figure 8:
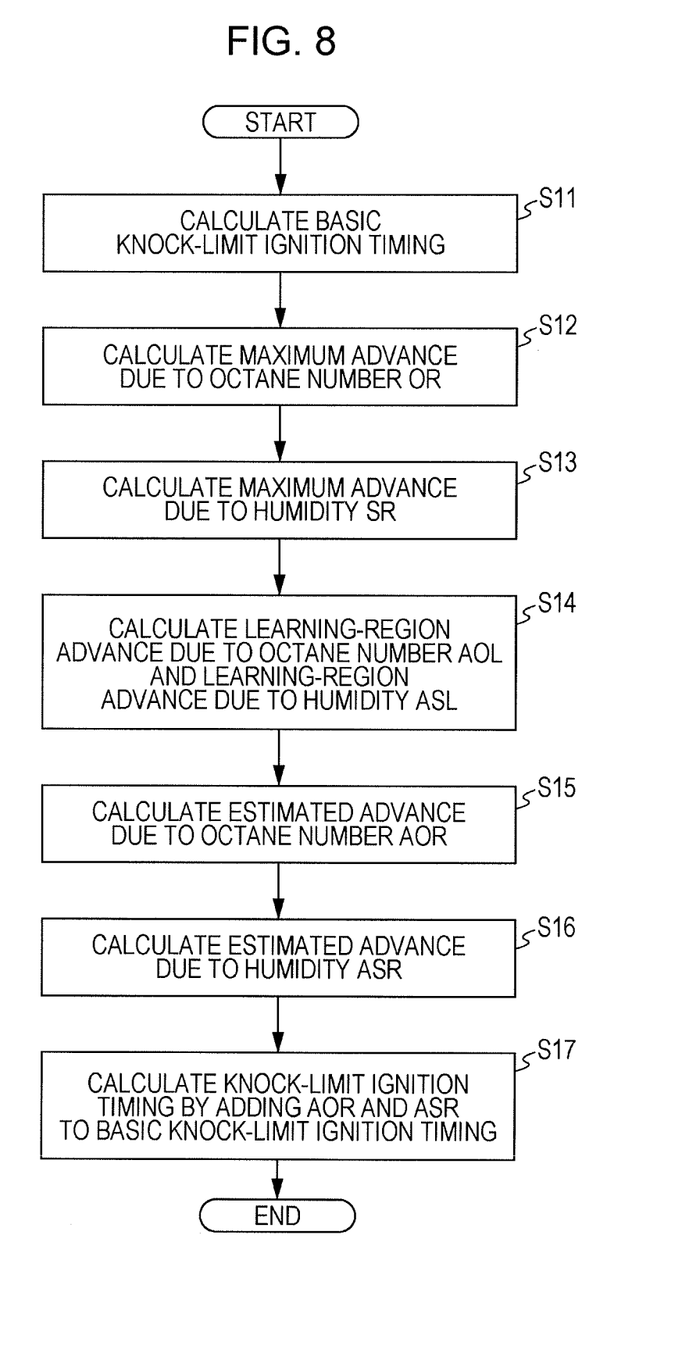
FIG. 8 is a flowchart of a knock-limit ignition timing calculation routine according to the embodiment of the present invention.

FIG. 8 is a flowchart illustrating the knock-limit ignition timing calculation routine. The controller 4 repeatedly performs the routine at each predetermined calculation period (for example, 10 ms).

In step S11, the controller 4 refers to the map of FIG. 3, and calculates the basic knock-limit ignition timing on the basis of the engine speed and the engine load. In step S12, the controller 4 refers to the graph of FIG. 6, and calculates the maximum advance due to octane number OR at the present engine speed. In step S13, the controller 4 refers to the graph of FIG. 7, and calculates the maximum advance due to humidity SR at the present engine speed.

In step S14, the controller 4 calculates the learning-region advance due to octane number AOL by using equation (9) on the basis of the low-rotation learning advance AL and the high-rotation learning advance AH that are detected, the maximum advance due to octane number OL in the low rotation region stored beforehand in the controller 4, the maximum advance due to octane number OH in the high rotation region, the maximum advance due to humidity SL in the low rotation region, and the maximum advance due to humidity SH in the high rotation region. The controller 4 then calculates the learning-region advance due to humidity ASL by using equation (10).

In step S15, the controller 4 calculates the estimated advance due to octane number AOR at the present engine speed by using equation (11) on the basis of the maximum advance due to octane number OR at the present engine speed, the maximum advance due to octane number OL in the low rotation region, and the learning-region advance due to octane number AOL.

In step S16, the controller 4 calculates the estimated advance due to humidity ASR at the present engine speed by using equation (12) on the basis of the maximum advance due to humidity SR at the present engine speed, the maximum advance due to humidity SL in the low rotation region, and the learning-region advance due to humidity ASL.

In step S17, the controller 4 calculates the knock-limit ignition timing by using equation (13) on the basis of the basic knock-limit ignition timing BIT, the estimated advance due to octane number AOR, and the estimated advance due to humidity ASR.

As described above, in the present embodiment, the advance from the basic knock-limit ignition timing due to the influence of the octane number of fuel (advance due to octane number) and the advance from the basic knock-limit ignition timing due to the influence of the ambient humidity (advance due to humidity) are independently calculated. That is, the basic knock-limit ignition timing is defined as the knock-limit ignition timing when a predetermined octane number fuel is used and the humidity is at the predetermined humidity, plus the amount of change in the knock-limit ignition timing from the basic knock-limit ignition timing due to the difference in the octane number between the predetermined octane number fuel and the fuel actually used, and the amount of change in the knock-limit ignition timing from the basic knock-limit ignition timing due to the difference between the predetermined humidity and the present ambient humidity, which are independently calculated.

Thus, the knock-limit ignition timing accurately reflects the advance from the basic knock-limit ignition timing due to the influences of the octane number of fuel and the ambient humidity, so that the knock-limit ignition timing can be accurately calculated. Further, on the basis of learning values of knock-limit ignition timing that have been learned in two predetermined operating regions, the advance due to octane number (learning-region advance due to octane number) and the advance due to humidity (learning-region advance due to humidity) in one of the operating regions are calculated, and by using the results of these calculations, the advance due to octane number and the advance due to humidity in the present operating state are calculated.

Thus, it is not necessary to perform learning of the knock-limit ignition timing in all operating regions for each engine speed and each engine load. By performing learning in the two predetermined operating regions, the advance due to octane number and the advance due to humidity for all operating regions can be calculated. When the two predetermined operating regions are set to be the operating regions having comparatively high frequency of use, the knock-limit ignition timing can be calculated more accurately by increasing the learning frequency.

The maps and graphs illustrated FIGS. 5A to 7 can serve as the maps and the graphs to be stored in the controller 4 to calculate the advance due to octane number and the advance due to humidity. Therefore, man-hours for development for performing a preliminary experiment and the like can be reduced.

Until it is determined that the octane number of fuel has changed due to supply of fuel or the like, the previous learning value of the knock-limit ignition timing is maintained even after the engine 1 is stopped. If the learning value is reset every time the engine 1 is stopped, ignition may be performed at a timing retarded from the actual knock-limit ignition timing until learning progresses, so that the fuel economy may decline. By maintaining the previous learning value until it is determined that the octane number has changed, such a decline in fuel economy can be prevented.

It is clear that the present invention is not limited to the above-described embodiment, and can be modified in various ways within the spirit and the scope of the present invention.

For example, in the above-described embodiment, the knock-limit ignition timing when the humidity is low and a low octane fuel is used is defined as the basic knock-limit ignition timing. However, the knock-limit ignition timing when the humidity is high and a high octane fuel is used may be defined as the basic knock-limit ignition timing, and the knock-limit ignition timing may be calculated by calculating retard from the basic knock-limit ignition timing due to the influence of the octane number of fuel and retard from the basic knock-limit ignition timing due to the influence of the ambient humidity.

In the above-described embodiment, the knock-limit ignition timing is learned in the two predetermined operating regions. However, learning may be performed in three or more operating regions.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. An ignition timing controller for an internal combustion engine, the controller comprising:
    a basic knock-limit ignition timing calculator that calculates a basic knock-limit ignition timing on the basis of an operating state of the internal combustion engine, the basic knock-limit ignition timing being a knock-limit ignition timing when a predetermined basic octane number fuel is used and an ambient humidity is at a predetermined basic ambient humidity;
    a learning-region variation calculator that learns the knock-limit ignition timing of the internal combustion engine in two predetermined operating regions and calculates a learning-region variation due to octane number and a learning-region variation due to humidity on the basis of learning values of the knock-limit ignition timing in the two operating regions, the learning-region variation due to octane number being an amount of change in the knock-limit ignition timing from the basic knock-limit ignition timing due to an influence of an octane number of a fuel used in one of the two operating regions, the learning-region variation due to humidity being an amount of change in the knock-limit ignition timing from the basic knock-limit ignition timing due to an influence of the ambient humidity in the one of the two operating regions;
    an estimated variation calculator that estimates a variation due to octane number and a variation due to humidity on the basis of the learning-region variation due to octane number and the learning-region variation due to humidity, the variation due to octane number being the amount of change in the knock-limit ignition timing from the basic knock-limit ignition timing due to an influence of the octane number of the fuel used in a present operating state, the variation due to humidity being the amount of change in the knock-limit ignition timing from the basic knock-limit ignition timing due to an influence of the ambient humidity in the present operating state; and
    a knock-limit ignition timing calculator that calculates the knock-limit ignition timing in the present operating state on the basis of the basic knock-limit ignition timing, the variation due to octane number, and the variation due to humidity.

2. The ignition timing controller for an internal combustion engine according to claim 1,
    wherein a difference $\Delta$oct and a difference $\Delta$hum are stored beforehand for each rotation speed of the internal combustion engine, the difference $\Delta$oct being the difference between the basic knock-limit ignition timing and a knock-limit ignition timing when a reference octane number fuel is used and the ambient humidity is at the basic ambient humidity, the reference octane number fuel having an octane number that is different from the octane number of the basic octane number fuel, the difference $\Delta$hum being the difference between the basic knock-limit ignition timing and a knock-limit ignition timing when the ambient humidity is at a reference ambient humidity and the basic octane fuel is used, the reference ambient humidity being different from the basic ambient humidity, and wherein the learning-region variation calculator calculates the learning-region variation due to octane number and the learning-region variation due to humidity on the basis of the learning values of the knock-limit ignition timing in the two operating regions, the difference $\Delta$oct in the two operating regions, and the difference $\Delta$hum in the two operating regions.

3. The ignition timing controller for an internal combustion engine according to claim 2, wherein the estimated variation calculator calculates the variation due to octane number by multiplying the difference $\Delta$oct at a present rotation speed of the internal combustion engine by the ratio of the difference $\Delta$oct in one of the two operating regions to the learning-region variation due to octane number.

4. The ignition timing controller for an internal combustion engine according to claim 2, wherein the estimated variation calculator calculates the variation due to humidity by multiplying the difference $\Delta$hum at the present rotation of the internal combustion engine by the ratio of the difference $\Delta$hum in one of the two operating regions to the learning-region variation due to humidity.

5. The ignition timing controller for an internal combustion engine according to claim 1, wherein the two operating regions are operating regions of the internal combustion engine having high frequency of use.

6. The ignition timing controller for an internal combustion engine according to claim 1, further comprising:

a fuel supply detector that detects whether new fuel has been supplied, wherein the learning-region variation calculator resets the learning values of the knock-limit ignition timing in the two operating regions to initial values when new fuel has been supplied.

7. An ignition timing controller for an internal combustion engine, the controller comprising:

a basic knock-limit ignition timing calculation means for calculating a basic knock-limit ignition timing on the basis of an operating state of the internal combustion engine, the basic knock-limit ignition timing being a knock-limit ignition timing when a predetermined basic octane number fuel is used and an ambient humidity is at a predetermined basic ambient humidity;

a learning-region variation calculation means for learning the knock-limit ignition timing of the internal combustion engine in two predetermined operating regions and calculates a learning-region variation due to octane number and a learning-region variation due to humidity on the basis of learning values of the knock-limit ignition timing in the two operating regions, the learning-region variation due to octane number being an amount of change in the knock-limit ignition timing from the basic knock-limit ignition timing due to an influence of an octane number of a fuel used in one of the two operating regions, the learning-region variation due to humidity being an amount of change in the knock-limit ignition timing from the basic knock-limit ignition timing due to an influence of the ambient humidity in the one of the two operating regions;

an estimated variation calculation means for estimating a variation due to octane number and a variation due to humidity on the basis of the learning-region variation due to octane number and the learning-region variation due to humidity, the variation due to octane number being the amount of change in the knock-limit ignition timing from the basic knock-limit ignition timing due to an influence of the octane number of the fuel used in a present operating state, the variation due to humidity being the amount of change in the knock-limit ignition timing from the basic knock-limit ignition timing due to an influence of the ambient humidity in the present operating state; and a knock-limit ignition timing calculation means for calculating the knock-limit ignition timing in the present operating state on the basis of the basic knock-limit ignition timing, the variation due to octane number, and the variation due to humidity.

8. An ignition timing control method for an internal combustion engine, the method comprising:

calculating a basic knock-limit ignition timing on the basis of an operating state of the internal combustion engine, the basic knock-limit ignition timing being a knock-limit ignition timing when a predetermined basic octane number fuel is used and an ambient humidity is at a predetermined basic ambient humidity;

learning the knock-limit ignition timing of the internal combustion engine in two predetermined operating regions and calculating a learning-region variation due to octane number and a learning-region variation due to humidity on the basis of learning values of the knock-limit ignition timing in the two operating regions, the learning-region variation due to octane number being an amount of change in the knock-limit ignition timing from the basic knock-limit ignition timing due to an influence of an octane number of a fuel used in one of the two operating regions, the learning-region variation due to humidity being an amount of change in the knock-limit ignition timing from the basic knock-limit ignition timing due to an influence of the ambient humidity in the one of the two operating regions;

estimating a variation due to octane number and a variation due to humidity on the basis of the learning-region variation due to octane number and the learning-region variation due to humidity, the variation due to octane number being the amount of change in the knock-limit ignition timing from the basic knock-limit ignition timing due to an influence of the octane number of the fuel used in a present operating state, the variation due to humidity being the amount of change in the knock-limit ignition timing from the basic knock-limit ignition timing due to an influence of the ambient humidity in the present operating state; and calculating the knock-limit ignition timing in the present operating state on the basis of the basic knock-limit ignition timing, the variation due to octane number, and the variation due to humidity.

9. The ignition timing control method according to claim 8, further comprising:

storing beforehand a difference $\Delta$oct and a difference $\Delta$hum for each rotation speed of the internal combustion engine, the difference $\Delta$oct being the difference between the basic knock-limit ignition timing and a knock-limit ignition timing when a reference octane number fuel is used and the ambient humidity is at the basic ambient humidity, the reference octane number fuel having an octane number that is different from the octane number of the basic octane number fuel, the difference $\Delta$hum being the difference between the basic knock-limit ignition timing and a knock-limit ignition timing when the ambient humidity is at a reference ambient humidity and the basic octane fuel is used, the reference ambient humidity being different from the basic ambient humidity; and calculating the learning-region variation due to octane number and the learning-region variation due to humidity on the basis of the learning values of the knock-limit ignition timing in the two operating regions, the difference Δoct in the two operating regions, and the difference Δhum in the two operating regions.

10. The ignition timing control method according to claim 9, further comprising:

calculating the variation due to octane number by multiplying the difference Δoct at a present rotation speed of the internal combustion engine by the ratio of the difference Δoct in one of the two operating regions to the learning-region variation due to octane number.

11. The ignition timing control method according to claim 9, further comprising:

calculating the variation due to humidity by multiplying the difference Δhum at the present rotation of the internal combustion engine by the ratio of the difference Δhum in one of the two operating regions to the learning-region variation due to humidity.

12. The ignition timing control method according to claim 8, wherein the two operating regions are operating regions of the internal combustion engine having high frequency of use.

13. The ignition timing control method according to claim 8, further comprising:

detecting whether new fuel has been supplied; and resetting the learning values of the knock-limit ignition timing in the two operating regions to initial values when new fuel has been supplied.

* * * * *